1365X
U. Reid.
Making Hoes and Shovels.
Patented Aug. 31, 1810.
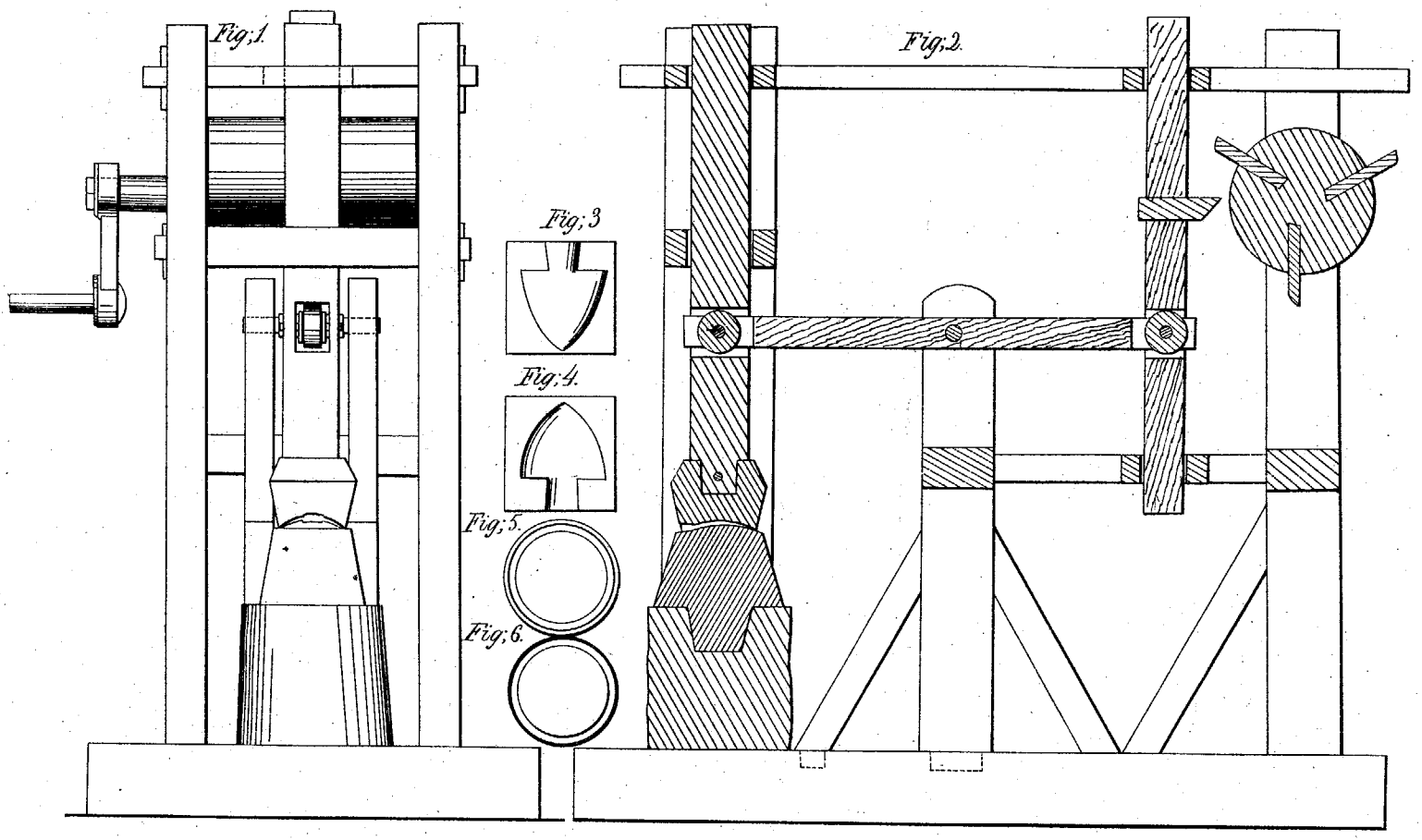
N. PETERS, PHOTO-LITHOGRAPHER, WASHINGTON, D. C.

7365X Aug 31 1810 Aug 31, 1810

Upton Reid

Letters Patent

The Schedule referred to in these Letters Patent and making part of the same containing a description in the words of the said Upton Reid himself of his machine for swaging or setting Shovels and Spades or Frying Pans The machine which is put in motion either by hand the force of Horses, water or other efficient moving power is for giving the shovel or spade or Frying pan its proper form after it has been beat sufficiently thin by a tilt hammer or otherwise so as much to abridge the labour now employed in that operation and to effect it in a better and more workmanlike manner.

There are two swages or setting forms of cast iron or other proper metal, one of which is fixed on a block in the floor, or in a frame & the other to the lower end of a moveable bar. The [illegible] surfaces of the swages is such as to give the shovel or spade or frying pan as plated out from the forge or tilt hammer the requisite and proper form and set. The lower surface of the upper swage being concave and the upper surface of the lower or fixed swage convex except at the socket which is reverse the upper ~~swage~~ is of weight sufficient to give the moving blow or percussion for forming the shovel or spade and the moveable bar of the upper swage passes through a mortice in an horizontal brace of the swage frame so that it may be guided by it in its perpendicular ascent and descent. There is also a mortice through this bar for receiving the end of the lever, and a friction wheel for rendering the motion more easy. An horizontal lever passes from the vertical bar of the moving swage over or through a mortice in a vertical post which supports the same as fulcrum. The other end of the lever at about the same distance from the fulcrum with the swage, or any other convenient distance is connected with the upper end of a stirrup which bears a projecting arm or tooth near the lower extremity. The stirrup rises vertically in a frame through a mortised horizontal block in the same manner as the vertical bar of the upper swage. Near this stirrup revolves an horizontal shaft which may be that of a water wheel or which receives its motion from a crank or handle or in

1365X any other manner. The shaft has two, three, or more projecting cams or teeth which by operating on the tooth or cam at the lower end of the stirrup depresses it and elevates the swage at the opposite end of the lever the weight of the swage in its descent giving the requisite blow on the plates shovel [illegible] pan or spade to be worked.

Exd. [illegible]

Ulysses Reid

Wit. Nicholas King
Geo. Dyon

Drawing made March 1841 [illegible]

[495 words